UNITED STATES PATENT OFFICE.

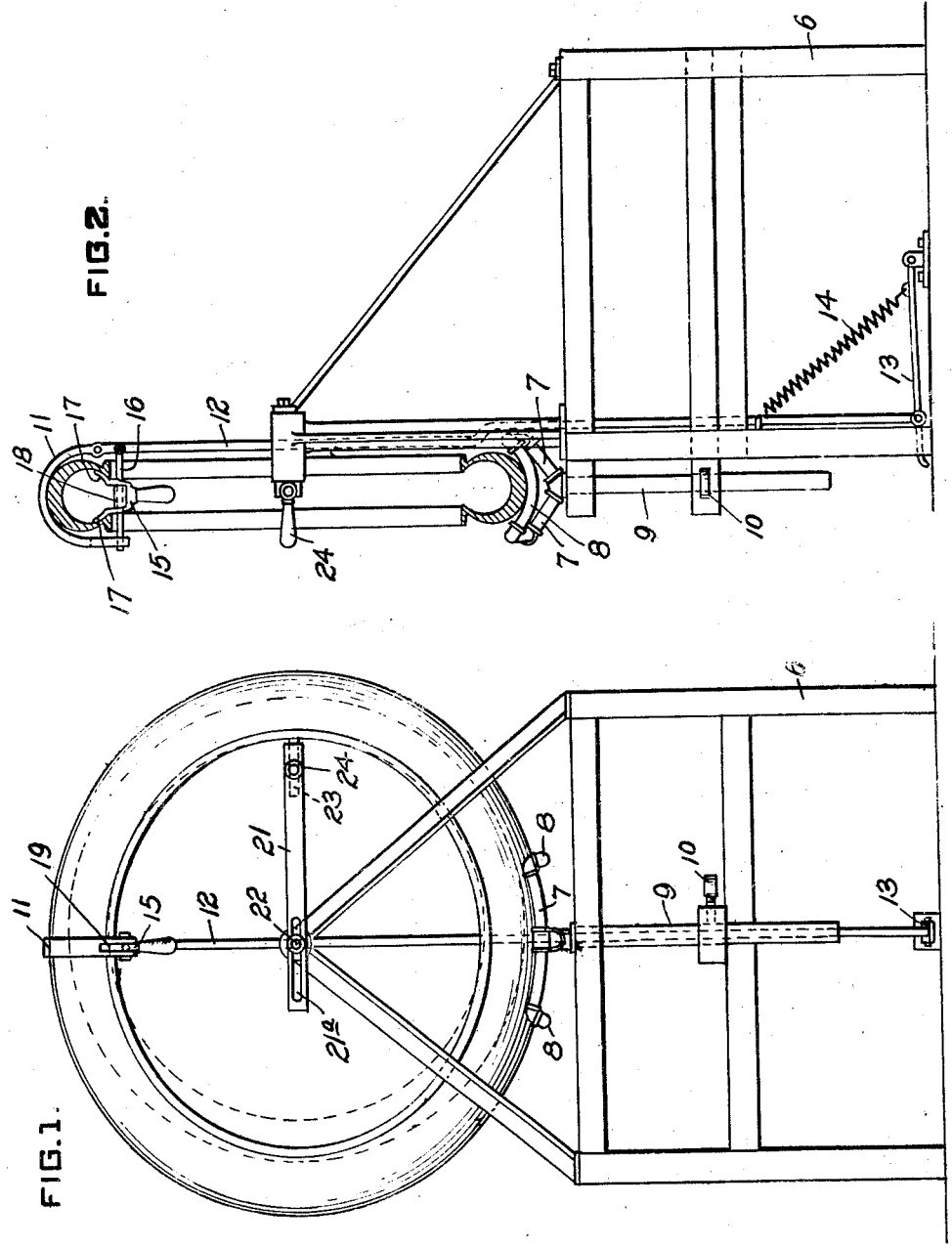

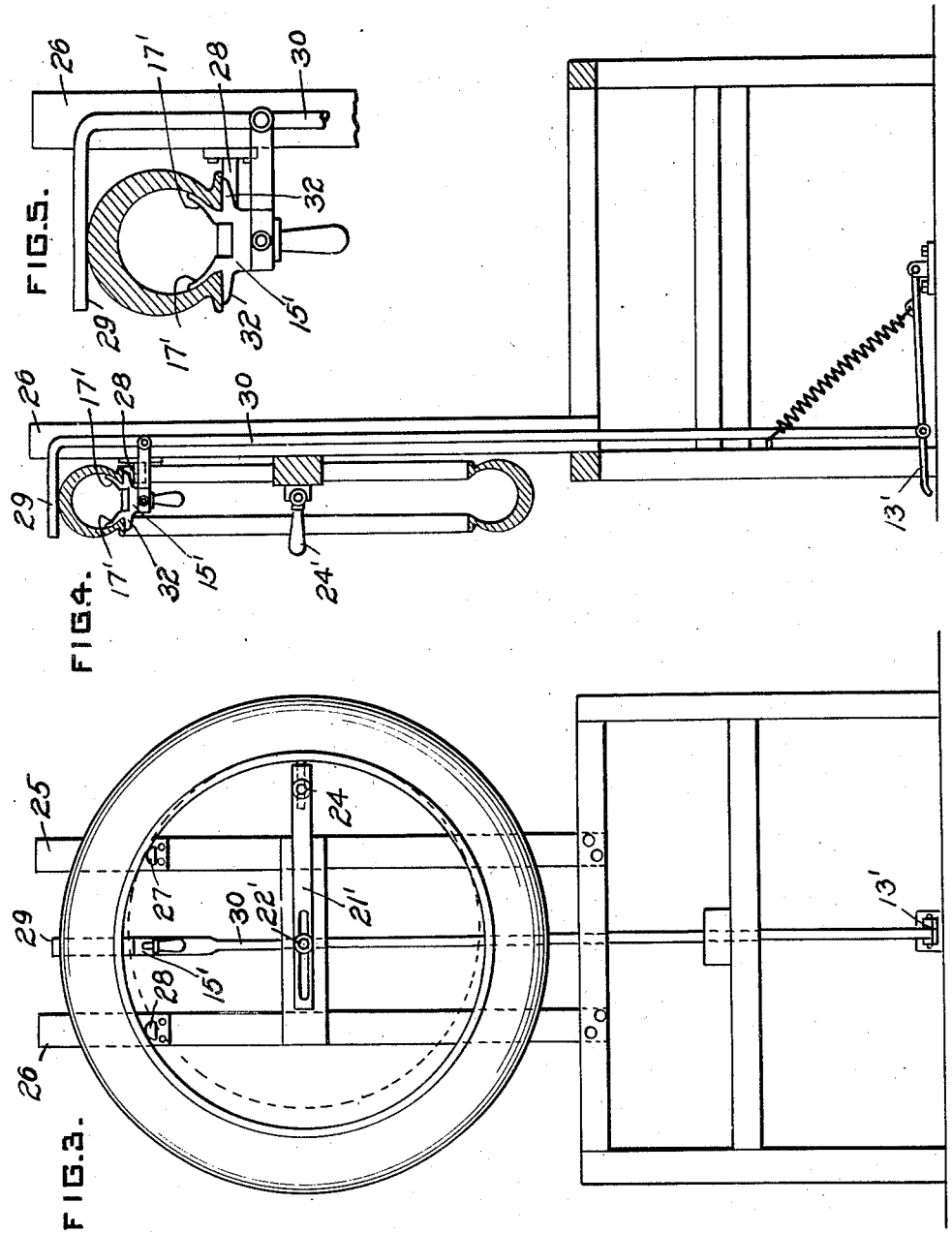

NORMAN D. CHELLIS, OF ERIE, PENNSYLVANIA.

MACHINE AND METHOD FOR INTRODUCING TUBES INTO TIRE-CASES.

1,379,169.

Specification of Letters Patent.

Patented May 24, 1921.

Application filed February 13, 1920. Serial No. 358,367.

*To all whom it may concern:*

Be it known that I, NORMAN D. CHELLIS, a citizen of the United States, and a resident of Erie, in the county of Erie and State of Pennsylvania, have made a new and useful Invention in Machines and Methods for Introducing Tubes into Tire-Cases, of which the following is a specification.

This invention relates to a machine for inserting inner tubes and air bags into the outer tire or case of pneumatic tires.

An object of the invention is to produce a simple and effective machine for simplifying the operation of introducing the inner tube and air bag into the case of a pneumatic tire.

This and other objects which will be made apparent throughout the further description of the invention is attained by means of apparatus embodying the features herein described and illustrated in the drawings accompanying and forming a part hereof.

In the drawings, Figure 1 is a front elevation of a machine embodying my invention, a tire case is shown in place on the machine. Fig. 2 is a side elevation of the machine shown in Fig. 1, the tire case being shown in section for convenience of illustration. Fig. 3 is a front elevation of a modified form of the machine shown in Fig. 1 and Fig. 4 is a view corresponding to Fig. 2 but showing a side elevation of the machine shown in Fig. 3. Fig. 5 is a view of the upper portion of Fig. 4 on a larger scale.

During the process of manufacturing the outer tube or the tire case of a pneumatic tire, an air bag is inserted into the partially finished case and is retained therein throughout the further operations of completing the case. The operation of inserting the air bag is difficult, since it is ordinarily done by hand, and requires considerable skill and experience on the part of the person inserting the air bag. Practically the same difficulty is experienced in inserting inner tubes into the tire cases, and in large establishments, such as rubber works where hundreds of tires are manufactured daily, the expense of inserting the tubes and air bags is quite an item, primarily because it requires a good deal of time and services of skilled and experienced workmen.

My invention materially reduces the amount of time necessary for the insertion of either an air bag or an inner tube into a tire case and at the same time makes it possible for a workman with little experience to insert the tubes or air bags.

In carrying out my invention, I employ means for mounting the case and holding it in position during the operation of inserting the inner tube or air bag. I also employ means for subjecting the case so supported to a distorting pressure for the purpose of spreading the beads of the case apart, so that an opening is provided between them through which the inner tube or air bag may be drawn. I also employ means for holding the beads apart even after the distorting pressure is removed from the case, and which operates as a guide for directing the tube into the casing through the opening occasioned by the spreading apart of the beads. The tube or air bag is partially inflated during the operation of inserting it and the valve stem is employed in drawing it into the casing over the guide. I, therefore, employ means for engaging the valve stem and for moving it in the proper path for drawing the partially inflated tube or air bag into the casing.

The machine illustrated in Figs. 1 and 2 is provided with a base or supporting frame 6 on which a tire support 7 is so mounted that it is capable of being moved to different positions for the purpose of accommodating tires of different size or diameter. As shown, the support is provided with two case engaging brackets 8, which are spaced apart so that they engage the outer peripheral face of the case at separate points. The support is so arranged that the portion of the tire case between the brackets 8 may extend more or less below the plane of the brackets depending upon the diameter of the case. I have found that it is desirable to have the brackets spaced approximately 12″ apart since with this arrangement cases of different size may be centered on the machine with sufficient exactness to insure the proper operation of the machine. In the drawings, I have shown the support provided with a vertically extending guide 9, which is mounted in suitable ways formed on the frame 6 and I have also shown a set screw 10, which may be employed for adjusting the support to different vertical positions.

The tire case mounted on the support is engaged at its uppermost point by a standard or head 11, which is capable of being moved downwardly for the purpose of exerting a distorting pressure on the tire case. As shown in the drawings, the head 11 is provided with an actuating rod 12 which is suitably mounted on the frame and which is adapted to be actuated by means of a foot lever 13. The lever 13 may be provided with a spring 14 for normally holding it and the head 11 in a raised or inoperative position. As shown in Fig. 2, the standard 11 is rigidly mounted on the rod 12 and is adapted to partially surround the uppermost portion of the tire, so that it exerts a downward pressure along a diameter of the casing when the foot lever is depressed. Such a pressure distorts the portion of the casing adjacent to the point of application of the pressure and causes the beads of the tire to move apart. I have shown a combination spreader and guide 15 pivotally mounted on the standard 11 or the rod 12 so that it normally hangs out of the way but is capable of moving with the rod. As shown, member 15 is provided with an arm 16 which is pivotally mounted on the rod 12 in such a position that it will clear the beads of the casing when the member 15 is moved to the operative position shown in Fig. 2. The member is also provided with fingers 17 which are adapted to move into the space occasioned by the spreading of the beads and to engage the inner faces of the case for the purpose of holding the beads in the spread position even after the distorting pressure is released. This member is also provided with a guide roller 18 which is located between the fingers 17 and operates to guide the inner tube or the air bag during the operation of inserting it into the case. It will be apparent that by employing a roller 18 the friction between the tube or air bag and the guide is materially reduced. As shown in Fig. 2 the arm 16 of the element 15 is extended so that it is capable of moving into engagement with a slot 19 formed in a depending portion of the head 11. This arrangement prevents the arm 16 from tending to turn to angular position when subjected to a transverse pull during the operation of inserting the tube.

In inserting the tube, the tire case is mounted in position on the support 7 and the head 11 is moved downwardly by the foot lever 13 so as to distort the case and spread the beads of the case apart. A partially inflated inner tube is then placed in position between the fingers 17 of the combination spreader and guide and that member is swung upwardly into the case between the spread beads so that its fingers 17 engage the inner faces of the casing at points immediately adjacent to the beads. After the tube and the spreader are thus introduced into the casing, the foot lever 13 may be released if desired since the spreader will hold the beads apart a sufficient amount to insure an easy entrance of the remainder of the tube or air bag into the case.

In this first step of introducing the tube into the case the operator is careful to insert that portion of the tire immediately adjacent to the valve stem so that the valve stem may be employed in moving the inserted portion of the tube through the casing and in this way drawing the remainder of the tube into the case over the combination spreader and guide.

In the drawings, I have shown a movable arm 21 mounted on a pin 22 carried by the frame portion 6 and located in such a position that it is substantially central with relation to a case on the support 7. The connection between pin 22 and the arm 21 is a slot connection so that the arm may be moved to different radial or longitudinal positions. The outer end of the arm is provided with a socket, which is adapted to receive the valve stem of an inner tube or air bag and it is also provided with a handle 24 for swinging it around the supporting pin 22, during the operation of drawing an inner tube or bag into the case. The slot connection between the arm 21 and pin 22 enables the operator to easily insert the valve stem into the socket by in effect moving the socket over the stem.

In the operation of inserting the tube or air bag, the arm 21 is moved into engagement with the projecting valve stem, which is secured to that portion of the tube first introduced into the case and then is swung completely around the tire case from a position on one side of the guide 15 to a corresponding position on the other side of the guide. After the tube is in place the valve stem is released by moving the arm downwardly and the guide and spreader is then withdrawn from the case and the case removed from the support.

In Figs. 3 and 4, I have shown a modified form of machine which may be employed in inserting inner tubes but which, in my opinion is primarily adapted for use in inserting the air bags. The machine may be provided with a frame similar to the frame 6 but as shown is provided with two uprights 25 and 26 on which case supporting brackets 27 and 28 are rigidly mounted. These brackets are adapted to engage one bead of the case and in this way suspend the case. They, like the brackets 8, are spaced apart about 12 inches. A standard or head 29 is so located with relation to the supports 27 and 28 that it will engage the outer peripheral face of the casing at a point substantially midway between the supports 27 and 28. This head, like the head 11, is capable of being moved downwardly for the purpose of applying a distorting pressure on the casing and is, therefore, provided with a suitable operating rod 30 which is mounted in guides carried by the members 25 and 26 or by the frame portion of the machine. This rod like the rod 12 may be provided with an operating lever 13; which if desired may be provided with a spring actuated latch for holding it in a depressed position. A guide and spacer 15' is mounted on the head 29 as described in connection with the head 11 and like the member 15 is adapted to hold the beads in a spread position and also guide the tube or air bag during the operation of drawing it into the casing. The machine is also provided with a valve stem engaging arm 21' which is similar in its construction, location and operation to the member 21 described in connection with Figs. 1 and 2.

In Fig. 5, I have shown the member 15 as provided with lugs 32 against which the edges of the beads are adapted to rest when the fingers 17' are in place in the case. With this arrangement the spreader positively hold the beads in the desired position and at the same time it may be easily withdrawn from the case after the tube or air bag has been inserted.

An important feature of my invention is that machines embodying it materially simplify the operation of inserting tubes and flaps. Tires of certain sizes are usually provided with flaps and their insertion into the case is a source of difficulty. The usual procedure is to tuck the flap into the case at the time of tucking the tube into the case. The workman places a case in an upright position, then distorts it by pressing downwardly with his chest; he then tucks a portion of the tube and flap into the case through the small opening between the beads caused by the partial distortion of the case. The case is then rolled a short distance and the case distorting tube and flap tucking operation is repeated. This necessitates considerable space since the tire must be rolled a sufficient distance to insure a complete revolution. In addition the work of inserting tubes and air bags is, as has been said, very difficult, and is termed "man killing work" by the workman engaged in it.

With my machine, the flap is inserted with the tube and gives little difficulty. Flaps are ordinarily two ended and are provided near each end with an aperture which fits over the valve stem of the tube for the purpose of preventing circumferential slipping. With my machine the flap is secured to the partially inflated tube by inserting the valve stem through one of the apertures in the flap. The tube and flap are then placed on the member 15 with the flap between the roller 18 and the tube and with the valve stem pointing away from the fingers 17. The member 15 is then inserted into the case, carrying with it that portion of the tube and that portion of the flap held in place by it. The arm 21 is then moved into engagement with the valve stem and is swung around the pin 22 as previously described. During this operation there is a tendency for the flap to curl and fold, but the operation has one hand free and may easily guide the flap over the roller 18 by causing it to pass between the fingers of his free hand. After the flap and tube are in place in the case, the end of the flap is secured to the valve stem by inserting the stem through the aperture in the flap. This last operation may be performed after the case is removed from the machine.

In acordance with the provisions of the patent statutes, I have illustrated what I now consider to be the preferred embodiments of my invention but it will be understood that various changes, modifications, additions or omissions may be made in the apparatus illustrated without departing from the spirit and scope of the invention as set forth by the appended claims:

1. A machine for inserting inner tubes or air bags into cases of pneumatic tires, comprising a support for a tire case, means for subjecting the case on the support to a distorting pressure to spread the beads of the case apart, a spreader for carrying the inner tube or air bag into the case and for engaging the spread beads, and means for engaging the valve stem of the tube or bag and for drawing the length of the tube or bag into the case through the opening between the spread beads.

2. A machine for inserting inner tubes or air bags into cases of pneumatic tires, comprising a support for the case, means for applying a distorting pressure to the case and a guide for carrying a portion of the inner tube or bag into the opening occasioned by the spreading of the beads in response to the distorting pressure.

3. A machine for inserting inner tubes or air bags into cases of pneumatic tires, a support for the case, a movable head for exerting a distorting pressure on the outer face of the tire for the purpose of spreading the beads of the tire apart, and a guide for carrying the tube into the space occasioned by the spreading of the beads, and for guiding the tube during the operation of drawing it into the tire.

4. In combination in a machine for inserting tubes or air bags into tire cases, a support for the case, a movable head for applying a distorting pressure to the case on the support and for thereby spreading the beads, a guide movable with said head and movable into the case through the space between the spread beads, for moving a tube or air bag into the case.

5. In combination in a machine for inserting tubes or air bags into tire cases, a case support comprising spaced brackets on which a case is mounted, means for distorting a portion of the case to spread the beads of the case apart, and a guide for engaging the spread beads and for guiding the tube during the operation of drawing it into the case through the space between the spread beads.

6. In combination in a machine for inserting tubes or air bags into tire cases, a case support comprising brackets for engaging a bead of the case and for suspending the case, a head for engaging the outer face of the case midway between the points of support, a spreader and guide for introducing a portion of a tube or air bag into the case between the spread portions of the beads, and means for engaging the valve stem of the tube or bag and drawing the remainder of the tube or bag into the case over the guide.

7. A method of inserting an inner tube or air bag into a tire case, which consists in distorting the case at a point along its circumferential length for the purpose of spreading the beads at the point of distortion, then introducing a portion of the tube or air bag through the space between the spread portions of the beads then moving the inserted portion of the tube or bag circumferentially through the case while holding the spread portions of the beads apart.

In testimony whereof I have hereunto subscribed my name this 28th day of January, 1920.

NORMAN D. CHELLIS.